United States Patent Office.

CARL GASSNER, JR., OF MENTZ, GERMANY.

GALVANIC BATTERY.

SPECIFICATION forming part of Letters Patent No. 373,064, dated November 15, 1887.

Application filed May 20, 1887. Serial No. 238,909. (No specimens.) Patented in Germany April 8, 1886, No. 37,758; in Austria-Hungary May 21, 1886, No. 35,974 and No. 64,357; in Belgium July 16, 1886, No. 73,872; in France July 17, 1886, No. 177,465, and in England December 22, 1886, No. 16,810.

*To all whom it may concern:*

Be it known that I, CARL GASSNER, Jr., of the city of Mentz and Empire of Germany, have made a certain new and useful Improvement in Galvanic Elements, of which the following is a specification.

My invention relates to galvanic elements; and it consists in the intermixture and employment of oxide of zinc as an addition to the exciting agent for galvanic elements, substantially as hereinafter described and claimed.

The oxide of zinc may be employed with great advantage as a constituent of any well-known exciting agent for the elements, with which it can be mechanically mixed and introduced into the galvanic cell and act therein, as hereinafter set forth. I do not, however, claim its employment when mixed with an exciting-fluid for the electrodes and applied thereto before being introduced into the cell, so as by chemical action to transform the zinc oxide at once into a chemically-different salt—as, for instance, dilute sulphuric acid—which transforms it into zinc sulphate.

I have found that the method of mixing and employing the zinc oxide set forth in the following description gives good results; but I do not confine my invention to the precise ingredients or proportions of the other constituents thereof named, as it is evident that well-known equivalents may be employed, and that the proportions of the other ingredients and of the zinc oxide may be advantageously varied, according to the different galvanic action required, whether constant or intermittent, even or varying. The essential requisite of securing the presence of the zinc oxide in the exciting agent while acting upon the electrodes must, however, be preserved.

The form of element I prefer to employ is composed of a zinc cylinder containing an isolated cylinder of carbon manganese, between which two cylinders exists a space which is filled up with the exciting agent, in liquid or semi-liquid form, which after awhile becomes comparatively hard and solid. This agent is made up, according to my improvement, preferably of the following ingredients, in the proportions stated, namely: oxide of zinc, one (1) part, by weight; sal-ammoniac, one (1) part, by weight; plaster, three (3) parts, by weight; chloride of zinc, one (1) part, by weight; water, two (2) parts, by weight. The oxide of zinc in this composition has this effect, after it is introduced into the cell—viz., that it loosens and makes it porous, and the greater porosity thus obtained facilitates essentially the interchange of the gases and diminishes the tendency to the polarization of the electrodes.

The inner resistance of the elements will not be raised by the addition of the oxide of zinc, as the latter is a better conductor of electricity than plaster and other similar bodies, which produce only a partial and varying porosity.

Elements combined with oxide of zinc in the galvanic cell, substantially as hereinbefore described, are of a much superior constancy.

What I claim as new and of my invention is—

In a galvanic battery, the combination of zinc oxide with the exciting agent, the oxide being in a state of mechanical mixture or distribution throughout the mass of said exciting agent, substantially as described.

CARL GASSNER, JR.

Witnesses:
KARL WENZ,
CARL ED. HAHN.